(12) United States Patent
Lee et al.

(10) Patent No.: US 9,651,115 B2
(45) Date of Patent: May 16, 2017

(54) PLANETARY GEAR TRAIN OF AUTOMATIC TRANSMISSION FOR VEHICLES

(71) Applicant: Hyundai Motor Company, Seoul (KR)

(72) Inventors: Chang Wook Lee, Suwon-si (KR); Sueng Ho Lee, Seoul (KR); JongSool Park, Hwaseong-si (KR); KyeongHun Lee, Seoul (KR); Dong Hwan Hwang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/927,259

(22) Filed: Oct. 29, 2015

(65) Prior Publication Data

US 2016/0356349 A1 Dec. 8, 2016

(30) Foreign Application Priority Data

Jun. 2, 2015 (KR) ........................ 10-2015-0077996

(51) Int. Cl.
*F16H 3/66* (2006.01)

(52) U.S. Cl.
CPC ....... *F16H 3/66* (2013.01); *F16H 2200/0069* (2013.01); *F16H 2200/0086* (2013.01); *F16H 2200/2012* (2013.01); *F16H 2200/2048* (2013.01)

(58) Field of Classification Search
CPC ..... F16H 2200/0069; F16H 2200/0086; F16H 2200/2048
See application file for complete search history.

(56) References Cited

U.S. PATENT DOCUMENTS

| 9,074,662 | B2 | 7/2015 | Mellet et al. | |
|---|---|---|---|---|
| 9,175,747 | B2 | 11/2015 | Lippert et al. | |
| 2016/0319913 | A1* | 11/2016 | Park | F16H 3/66 |
| 2016/0327130 | A1* | 11/2016 | Lee | F16H 3/66 |
| 2016/0327133 | A1* | 11/2016 | Lee | F16H 3/66 |

FOREIGN PATENT DOCUMENTS

| KR | 10-2012-0119451 A | 10/2012 |
|---|---|---|
| KR | 10-1394033 B1 | 5/2014 |

* cited by examiner

*Primary Examiner* — Derek D Knight
(74) *Attorney, Agent, or Firm* — Morgan, Lewis & Bockius LLP

(57) ABSTRACT

A planetary gear train of an automatic transmission for vehicles may include an input shaft receiving power of an engine, an output shaft outputting shifted power of the engine, a first planetary gear set including first, second, and third rotational elements, a second planetary gear set including fourth, fifth, and sixth rotational elements, a third planetary gear set including seventh, eighth, and ninth rotational elements, a fourth planetary gear set including tenth, eleventh, and twelfth rotational elements, and seven control elements disposed between the rotational elements and at positions at which the rotational elements and a transmission housing are selectively connected.

13 Claims, 2 Drawing Sheets

FIG. 2

| | CONTROL ELEMENT | | | | | | | GEAR RATIO | INTERSTAGE RATIO | SPAN OF SHIFT RATIO |
|---|---|---|---|---|---|---|---|---|---|---|
| | B1 | B2 | B3 | C1 | C2 | C3 | C4 | | | |
| 1ST |  | ● | ● |  |  |  | ● | 4.721 | 1.559 | 9.877 |
| 2ND |  |  | ● |  | ● |  | ● | 3.029 | 1.411 | |
| 3RD |  | ● | ● |  | ● |  |  | 2.147 | 1.341 | |
| 4TH |  | ● | ● |  |  | ● |  | 1.601 | 1.324 | |
| 5TH |  | ● |  |  | ● | ● |  | 1.209 | 1.209 | |
| 6TH |  |  |  |  | ● | ● | ● | 1.000 | 1.151 | |
| 7TH |  | ● |  |  |  | ● | ● | 0.869 | 1.234 | |
| 8TH | ● |  |  |  |  | ● | ● | 0.704 | 1.218 | |
| 9TH | ● | ● |  |  |  | ● |  | 0.578 | 1.209 | |
| 10TH | ● |  |  | ● |  | ● |  | 0.478 | | |
| REV1 | ● | ● | ● |  |  |  |  | -4.123 | | |
| REV2 | ● |  | ● | ● |  |  |  | -4.682 | | |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2015-0077996 filed Jun. 2, 2015, the entire contents of which is incorporated herein for all purposes by this reference.

BACKGROUND OF THE INVENTION

Field of the Invention

The present invention relates to an automatic transmission for vehicles, and more particularly, to a planetary gear train of an automatic transmission for vehicles capable of improving power transfer performance and fuel efficiency and securing linearity of an inter-stage part of a shift stage by increasing a span of a shift ratio while implementing advance (i.e., forward) 10-speeds by a minimum configuration.

Description of Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As a result, research into reduction of weight and enhancement of fuel efficiency through downsizing has been conducted in the case of an engine and research for simultaneously securing operability and fuel efficiency competitiveness through multiple speed stages has been conducted in the case of an automatic transmission.

However, in the case of the automatic transmission, as the number of shift stages is increased, the number of internal components also increases, and as a result, the automatic transmission may be difficult to mount, the manufacturing cost and weight may be increased, and power transmission efficiency may be deteriorated.

Thus, in order to increase an effect of improving the fuel efficiency by the multi-stage transmission, it may be said that the development of a planetary gear train capable of maximizing efficiency with a small number of parts is important.

In this regard, an 8-speed automatic transmission has recently been implemented, and research and development into a planetary gear train capable of implementing a shift stage of 8-speed or more has been actively conducted.

However, in the case of the recent 8-speed automatic transmission, since a span of a shift ratio is maintained to a level of 6.5 to 7.5, the 8-speed automatic transmission does not have a great effect of improving the fuel efficiency.

As a result, in the case in which the span of the shift ratio of the 8-speed automatic transmission is set to a level of 9.0 or more, since linearity of an inter-stage ratio of a shift stage may not be secured, running efficiency of the engine and drivability of the vehicle are degraded. Therefore, there is a need to develop a high efficient automatic transmission of at least 9-speed or more.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for vehicles having advantages of improving power transfer performance and fuel efficiency and securing linearity of an inter-stage part of a shift stage by increasing a span of a shift ratio while implementing a shift stage of advance 10-speed and reverse 2-speed by a minimum configuration.

According to various aspects of the present invention, a planetary gear train of an automatic transmission for vehicles may include an input shaft receiving power of an engine, an output shaft outputting shifted power of the engine, a first planetary gear set including first, second, and third rotational elements, a second planetary gear set including fourth, fifth, and sixth rotational elements, a third planetary gear set including seventh, eighth, and ninth rotational elements, a fourth planetary gear set including tenth, eleventh, and twelfth rotational elements, and seven control elements disposed between the rotational elements and at positions at which the rotational elements and a transmission housing are selectively connected, in which the input shaft may be continuously connected to the first rotational element, the output shaft may be continuously connected to the eleventh rotational element, the third rotational element may be continuously connected to the fifth rotational element, the sixth rotational element may be continuously connected to the seventh rotational element, the eighth rotational element may be continuously connected to the twelfth rotational element, the ninth rotational element may be continuously connected to the eleventh rotational element, the second rotational element may be selectively connected to the input shaft through a portion of the control elements, and three control elements of the seven control elements may be operated, such that ten advance speeds and at least one reverse speed are implemented.

The second rotational element may be selectively connected to the transmission housing, the fourth rotational element may be selectively connected to the transmission housing, the tenth rotational element may be selectively connected to the transmission housing, the output shaft may be selectively connected to the fourth rotational element, the input shaft may be selectively connected to the eighth rotational element, and the sixth rotational element may be selectively connected to the second rotational element.

The first, second, and third rotational elements of the first planetary gear set may be a sun gear, a planetary carrier, and a ring gear, respectively, the fourth, fifth, and sixth rotational elements of the second planetary gear set may be a sun gear, a planetary carrier, and a ring gear, respectively, the seventh, eighth, and ninth rotational elements of the third planetary gear set may be a sun gear, a planetary carrier, and a ring gear, respectively, and the tenth, eleventh, and twelfth rotational elements of the fourth planetary gear set may be a sun gear, a planetary carrier, and a ring gear, respectively.

According to various aspects of the present invention, a planetary gear train of an automatic transmission for vehicles may include an input shaft receiving power of an engine, an output shaft outputting shifted power, a first planetary gear set including first, second, and third rotational elements, a second planetary gear set including fourth, fifth, and sixth rotational elements, a third planetary gear set including seventh, eighth, and ninth rotational elements, a fourth planetary gear set including tenth, eleventh, and twelfth rotational elements, and seven control elements disposed between the rotational elements and at positions where the rotational elements and a transmission housing are selectively connected, a first rotational shaft including the first rotational element and directly connected to the input shaft, a second rotational shaft including the second rotational element and selectively connected to the first rotational shaft and selectively connected to the transmission housing simultaneously, a third rotational shaft including the third rotational element and the fifth rotational element, a fourth rotational shaft including the fourth rotational element and selectively connected to the transmission housing, a fifth rotational shaft including the sixth rotational element and the seventh rotational element and selectively connected to the second rotational element, a sixth rotational shaft including the eighth rotational element and the twelfth rotational element and selectively connected to the first rotational element, a seventh rotational shaft including the ninth rotational element and the eleventh rotational element and selectively connected to the fourth rotational shaft and directly connected to the output shaft simultaneously, and an eighth rotational shaft including the tenth rotational element and selectively connected to the transmission housing.

The first planetary gear set may be a single pinion planetary gear set, the first rotational element may be a first sun gear, the second rotational element may be a first planetary carrier, and the third rotational element may be a first ring gear, the second planetary gear set may be a single pinion planetary gear set, the fourth rotational element may be a second sun gear, the fifth rotational element may be a second planetary carrier, and the sixth rotational element may be a second ring gear, the third planetary gear set may be a single pinion planetary gear set, the seventh rotational element may be a third sun gear, the eighth rotational element may be a third planetary carrier, and the ninth rotational element may be a third ring gear, and the fourth planetary gear set may be a single pinion planetary gear set, the tenth rotational element may be a fourth sun gear, the eleventh rotational element may be a fourth planetary carrier, and the twelfth rotational element may be a fourth ring gear.

The seven control elements may include a first clutch selectively connecting the fourth rotational shaft and the seventh rotational shaft to each other, a second clutch selectively connecting the first rotational shaft and the second rotational shaft to each other, a third clutch selectively connecting the first rotational shaft and the sixth rotational shaft to each other, a fourth clutch selectively connecting the second rotational shaft and the fifth rotational shaft to each other, a first brake selectively connecting the second rotational shaft and the transmission housing to each other, a second brake selectively connecting the fourth rotational shaft and the transmission housing to each other, and a third brake selectively connecting the eighth rotational shaft and the transmission housing to each other.

Shift stages implemented by a selective operation of the seven control elements may include a first advance shift stage implemented by a simultaneous operation of the fourth clutch and the second and third brakes, a second advance shift stage implemented by a simultaneous operation of the second and fourth clutches and the third brake, a third advance shift stage implemented by a simultaneous operation of the second clutch and the second and third brakes, a fourth advance shift stage implemented by a simultaneous operation of the third clutch and the second and third brakes, a fifth advance shift stage implemented by a simultaneous operation of the second and third clutches and the second brake, a sixth advance shift stage implemented by a simultaneous operation of the second, third, and fourth clutches, a seventh advance shift stage implemented by a simultaneous operation of the third and fourth clutches and the second brake, an eighth advance shift stage implemented by a simultaneous operation of the third and fourth clutches and the first brake, a ninth advance shift stage implemented by a simultaneous operation of the third clutch and the first and second brakes, a tenth advance shift stage implemented by a simultaneous operation of the first and third clutches and the first brake, a first reverse shift stage implemented by a simultaneous operation of the first, second, and third brakes, and a second reverse shift stage implemented by a simultaneous operation of the first clutch and the first and third brakes.

According to various aspects of the present invention, a planetary gear train of the automatic transmission for vehicles may include an input shaft receiving power of an engine, an output shaft outputting shifted power of the engine, a first planetary gear set including first, second, and third rotational elements, a second planetary gear set including fourth, fifth, and sixth rotational elements, a third planetary gear set including seventh, eighth, and ninth rotational elements, a fourth planetary gear set including tenth, eleventh, and twelfth rotational elements, a first rotational shaft including the first rotational element and directly connected to the input shaft, a second rotational shaft including the second rotational element and selectively connected to the first rotational shaft and selectively connected to a transmission housing simultaneously, a third rotational shaft including the third rotational element and the fifth rotational element, a fourth rotational shaft including the fourth rotational element and selectively connected to the transmission housing, a fifth rotational shaft including the sixth rotational element and the seventh rotational element and selectively connected to the second rotational element, a sixth rotational shaft including the eighth rotational element and the twelfth rotational element and selectively connected to the first rotational element, a seventh rotational shaft including the ninth rotational element and the eleventh rotational element and selectively connected to the fourth rotational shaft and directly connected to the output shaft simultaneously, an eighth rotational shaft including the tenth rotational element and selectively connected to the transmission housing, a first clutch selectively connecting the fourth rotational shaft and the seventh rotational shaft to each other, a second clutch selectively connecting the first rotational shaft and the second rotational shaft to each other, a third clutch selectively connecting the first rotational shaft and the sixth rotational shaft to each other, a fourth clutch selectively connecting the second rotational shaft and the fifth rotational shaft to each other, a first brake selectively connecting the second rotational shaft and the transmission housing to each other, a second brake selectively connecting the fourth rotational shaft and the transmission housing to each other, and a third brake selectively connecting the eighth rotational shaft and the transmission housing to each other.

According to various aspects of the present invention, a planetary gear train of an automatic transmission for vehicles may include an input shaft receiving power of an engine, an output shaft outputting shifted power of the engine, a first planetary gear set, which may be a single pinion planetary gear set, including a first sun gear, a first planetary carrier, and a first ring gear, a second planetary gear set, which may be a single pinion planetary gear set, including a second sun gear, a second planetary carrier, and a second ring gear, a third planetary gear set, which may be a single pinion planetary gear set, including a third sun gear, a third planetary carrier, and a third ring gear, a fourth planetary gear set, which may be a single pinion planetary gear set, including a fourth sun gear, a fourth planetary carrier, and a fourth ring gear, a first rotational shaft including the first sun gear and directly connected to the input shaft, a second rotational shaft including the first planetary carrier and selectively connected to the first rotational shaft and selectively connected to a transmission housing simultaneously, a third rotational shaft including the first ring gear and the second planetary carrier, a fourth rotational shaft including the second sun gear and selectively connected to the transmission housing, a fifth rotational shaft including the second ring gear and the third sun gear and selectively connected to the second rotational shaft, a sixth rotational shaft including the third planetary carrier and the fourth ring gear and selectively connected to the first rotational shaft, a seventh rotational shaft including the third ring gear and the fourth planetary carrier and selectively connected to the fourth rotational shaft and directly connected to the output shaft simultaneously, an eighth rotational shaft including the fourth sun gear and selectively connected to the transmission housing, and seven control elements disposed between the rotational shafts and at selective connection positions between the rotational shafts and the transmission housing.

According to various embodiments of the present invention, the shift stage of advance (i.e., forward) 10-speeds and reverse 2-speeds may be implemented by combining four planetary gear sets formed of simple planetary gear sets with seven frictional elements.

In addition, since the span of the shift ratio of 9.0 or more is secured, engine running efficiency may be maximized.

In addition, the linearity of the inter-stage ratio of the shift stage is secured while multi-staging the shift stage at high efficiency, thereby making it possible to improve drivability such as acceleration before and after the shift, an engine speed rhythmic sense, and the like.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each shift stage of each control element which is used for the exemplary planetary gear train according to the present invention.

Figure 1:
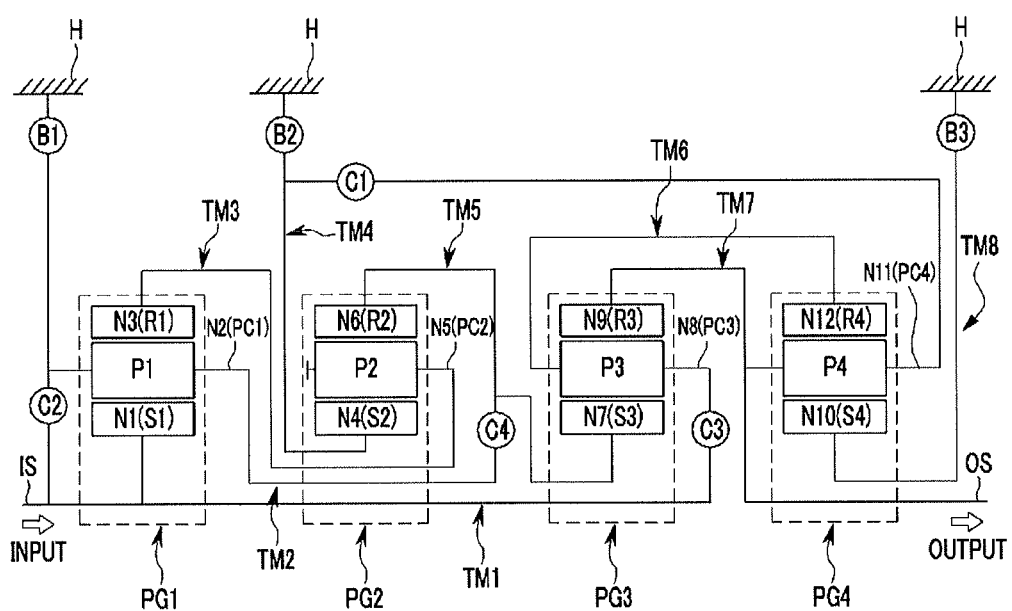
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to an exemplary embodiment of the present invention.

Referring to FIG. 1, the planetary gear train according to various embodiments of the present invention includes first, second, third, and fourth planetary gear sets PG1, PG2, PG3, and PG4 disposed on the same shaft line, an input shaft IS, an output shaft OS, eight rotational shafts TM1 to TM8 that directly connect the respective rotational elements of the first, second, third, and fourth planetary gear sets PG1, PG2, PG3, and PG4 to each other, seven frictional elements C1 to C4 and B1 to B3, and a transmission housing H.

In addition, rotation power input from the input shaft IS is shifted by a complementary operation of the first, second, third, and fourth planetary gear sets PG1, PG2, PG3, and PG4 and is output through the output shaft OS.

The respective simple planetary gear sets are disposed in the order of the first, second, third, and fourth planetary gear sets PG1, PG2, PG3, and PG4 from an engine side.

The input shaft IS is an input member, wherein rotation power from a crank shaft of the engine is converted into torque by a torque converter and is input to the input shaft IS.

The output shaft OS is an output member, and is disposed on the same shaft line as the input shaft to transfer shifted driving force to a driving shaft through a differential apparatus.

The first planetary gear set PG1, which is a single pinion planetary gear set, includes a first sun gear S1 which is a first rotational element N1, a first planetary carrier PC1 which is a second rotational element N2 supporting a first pinion P1 externally engaged with the first sun gear S1 which is the first rotational element N1, and a first ring gear R1 which is a third rotational element N3 internally engaged with the first pinion P1, as the rotational elements.

The second planetary gear set PG2, which is the single pinion planetary gear set, includes a second sun gear S2 which is a fourth rotational element N4, a second planetary carrier PC2 which is a fifth rotational element N5 supporting a second pinion P2 externally engaged with the second sun gear S2 which is the fourth rotational element N4, and a second ring gear R2 which is a sixth rotational element N6 internally engaged with the second pinion P2.

The third planetary gear set PG3, which is the single pinion planetary gear set, includes a third sun gear S3 which is a seventh rotational element N7, a third planetary carrier PC3 which is an eighth rotational element N8 supporting a third pinion P3 externally engaged with the third sun gear S3 which is the seventh rotational element N7, and a third ring gear R3 which is a ninth rotational element N9 internally engaged with the third pinion P3.

The fourth planetary gear set PG4, which is the single pinion planetary gear set, includes a fourth sun gear S4 which is a tenth rotational element N10, a fourth planetary carrier PC4 which is an eleventh rotational element N11 supporting a fourth pinion P4 externally engaged with the fourth sun gear S4 which is the tenth rotational element N10, and a fourth ring gear R4 which is a twelfth rotational element N12 internally engaged with the fourth pinion P4.

The third rotational element N3 is directly connected to the fifth rotational element N5, the sixth rotational element N6 is directly connected to the seventh rotational element N7, the eighth rotational element N8 is directly connected to the twelfth rotational element N12, and the ninth rotational element N9 is directly connected to the eleventh rotational element N11, such that the first, second, third, and fourth planetary gear sets PG1, PG2, PG3, and PG4 are operated while maintaining a total of eight rotational shafts TM1 to TM8.

A configuration of the eight rotational shafts TM1 to TM8 will be described below.

The first rotational shaft TM1 is configured to include the first rotational element N1 (first sun gear), and is directly connected to the input shaft IS.

The second rotational shaft TM2 is configured to include the second rotational element N2 (first planetary carrier), and is selectively connected to the first rotational shaft TM1 and is selectively connected to the transmission housing H at the same time.

The third rotational shaft TM3 is configured to include the third rotational element N3 (first ring gear) and the fifth rotational element N5 (second planetary carrier).

The fourth rotational shaft TM4 is configured to include the fourth rotational element N4 (second sun gear), and is selectively connected to the transmission housing H.

The fifth rotational shaft TM5 is configured to include the sixth rotational element N6 (second ring gear) and the seventh rotational element N7 (third sun gear), and is selectively connected to the second rotational shaft TM2.

The sixth rotational shaft TM6 is configured to include the eighth rotational element N8 (third planetary carrier) and the twelfth rotational element N12 (fourth ring gear), and is selectively connected to the first rotational shaft TM1.

The seventh rotational shaft TM7 is configured to include the ninth rotational element N9 (third ring gear) and the eleventh rotational element N11 (fourth planetary carrier), and is selectively connected to the fourth rotational shaft TM4 and is directly connected to the output shaft OS at the same time to thereby be continuously operated as an output element.

The eighth rotational shaft TM8 is configured to include the tenth rotational element N10 (fourth sun gear), and is selectively connected to the transmission housing H.

In addition, four clutches C1, C2, C3, and C4, which are control elements, are disposed at portions to which the rotational shafts are selectively connected to each other, of the rotational shafts TM1 to TM8.

In addition, three brakes B1, B2, and B3, which are the control elements, are disposed at portions of the rotational shafts TM1 to TM8 which are selectively connected to the transmission housing H.

Disposed positions of the seven control elements C1 to C4 and B1 to B3 will be described below.

The first clutch C1 is disposed between the fourth rotational shaft TM4 and the seventh rotational shaft TM7 to allow the fourth rotational shaft TM4 and the seventh rotational shaft TM7 to be selectively integrated with each other.

The second clutch C2 is disposed between the first rotational shaft TM1 and the second rotational shaft TM2 to allow the first rotational shaft TM1 and the second rotational shaft TM2 to be selectively integrated with each other.

The third clutch C3 is interposed between the first rotational shaft TM1 and the sixth rotational shaft TM6 to allow the first rotational shaft TM1 and the sixth rotational shaft TM6 to be selectively integrated with each other.

The fourth clutch C4 is interposed between the second rotational shaft TM2 and the fifth rotational shaft TM5 to allow the second rotational shaft TM2 and the fifth rotational shaft TM5 to be selectively integrated with each other.

The first brake B1 is interposed between the second rotational shaft TM2 and the transmission housing H to allow the second rotational shaft TM2 to be operated as a selective fixing element.

The second brake B2 is interposed between the fourth rotational shaft TM4 and the transmission housing H to allow the fourth rotational shaft TM4 to be operated as the selective fixing element.

The third brake B3 is interposed between the eighth rotational shaft TM8 and the transmission housing H to allow the eighth rotational shaft TM8 to be operated as the selective fixing element.

The respective control elements including the first, second, third, and fourth clutches C1, C2, C3, and C4, and the first, second, and third brakes B1, B2, and B3 may be formed of a multi-plate type hydraulic friction coupling unit which is frictionally coupled by hydraulic pressure.

FIG. 2 is an operation table for each shift stage of each control element which is used for the planetary gear train according to various embodiments of the present invention.

As shown in FIG. 2, the planetary gear train according to various embodiments of the present invention is shifted while three control elements are operated in each shift stage.

In an advance 1-speed shift stage (1ST), the fourth clutch C4 and the second and third brakes B2 and B3 are simultaneously operated. Thus, in a state in which the second rotational shaft TM2 and the fifth rotational shaft TM5 are connected to each other by the operation of the fourth clutch C4, an input to the first rotational shaft TM1 is performed, and the fourth and eighth rotational shafts TM4 and TM8 are operated as the fixing element by the operation of the second and third brakes B2 and B3, such that a shift of advance 1-speed is implemented and is outputted through the seventh rotational shaft TM7.

In an advance 2-speed shift stage (2ND), the second and fourth clutches C2 and C4 and the third brake B3 are simultaneously operated. Thus, in a state in which the first rotational shaft TM1 and the second rotational shaft TM2 are connected to each other by the operation of the second clutch C2, and the second rotational shaft TM2 and the fifth rotational shaft TM5 are connected to each other by the operation of the fourth clutch C4, the input is performed through the first rotational shaft TM1, and the eighth rotational shaft TM8 is operated as the fixing element by the operation of the third brake B3, such that a shift of advance 2-speed is implemented and is outputted through the seventh rotational shaft TM7.

In an advance 3-speed shift stage (3RD), the second clutch C2 and the second and third brakes B2 and B3 are simultaneously operated. Thus, in a state in which the first rotational shaft TM1 and the second rotational shaft TM2 are connected to each other by the operation of the second clutch C2, the input is performed through the first input shaft IS, and the fourth and eighth rotational shafts TM4 and TM8 are operated as the fixing element by the operation of the second and third brakes B2 and B3, such that a shift of advance 3-speed is implemented and is outputted through the seventh rotational shaft TM7.

In an advance 4-speed shift stage (4TH), the third clutch C3 and the second and third brakes B2 and B3 are simultaneously operated. Thus, in a state in which the first rotational shaft TM1 and the sixth rotational shaft TM6 are connected to each other by the operation of the third clutch C3, the input to the first rotational shaft TM1 is performed, and the fourth and eighth rotational shafts TM4 and TM8 are operated as the fixing element by the operation of the second and third brakes B2 and B3, such that a shift of advance 4-speed is implemented and is outputted through the seventh rotational shaft TM7.

In an advance 5-speed shift stage (5TH), the second and third clutches C2 and C3 and the second brake B2 are simultaneously operated. Thus, in a state in which the first rotational shaft TM1 and the second rotational shaft TM2 are connected to each other by the operation of the second clutch C2, and the first rotational shaft TM1 and the sixth rotational shaft TM6 are connected to each other by the operation of the third clutch C3, the input is performed through the first rotational shaft TM1, and the fourth rotational shaft TM4 is operated as the fixing element by the operation of the second brake B2, such that a shift of advance 5-speed is implemented and is outputted through the seventh rotational shaft TM7.

In an advance 6-speed shift stage (6TH), the second, third, and fourth clutches C2, C3, and C4 are simultaneously operated. Thus, in a state in which the first rotational shaft TM1 and the second rotational shaft TM2 are connected to each other by the operation of the second clutch C2, the first rotational shaft TM1 and the sixth rotational shaft TM6 are connected to each other by the operation of the third clutch C3, and the second rotational shaft TM2 and the fifth rotational shaft TM5 are connected to each other by the operation of the fourth clutch C4, all of the planetary gear sets become a state in which all of the planetary gear sets are directly connected, thereby implementing a shift of advance 6-speed in which the input is output as it is.

In an advance 7-speed shift stage (7TH), the third and fourth clutches C3 and C4 and the second brake B2 are simultaneously operated. Thus, in a state in which the first rotational shaft TM1 and the sixth rotational shaft TM6 are connected to each other by the operation of the third clutch C3, and the second rotational shaft TM2 and the fifth rotational shaft TM5 are connected to each other by the operation of the fourth clutch C4, the input is performed through the first rotational shaft TM1, and the fourth rotational shaft TM4 is operated as the fixing element by the operation of the second brake B2, such that a shift of advance 7-speed is implemented and is outputted through the seventh rotational shaft TM7.

In an advance 8-speed shift stage (8TH), the third and fourth clutches C3 and C4 and the first brake B1 are simultaneously operated. Thus, in a state in which the first rotational shaft TM1 and the sixth rotational shaft TM6 are connected to each other by the operation of the third clutch C3, and the second rotational shaft TM2 and the fifth rotational shaft TM5 are connected to each other by the operation of the fourth clutch C4, the input is performed through the first rotational shaft TM1, and the second rotational shaft TM2 is operated as the fixing element by the operation of the first brake B1, such that a shift of advance 8-speed is implemented and is outputted through the seventh rotational shaft TM7.

In an advance 9-speed shift stage (9TH), the third clutch C3 and the first and second brakes B1 and B2 are simultaneously operated. Thus, in a state in which the first rotational shaft TM1 and the sixth rotational shaft TM6 are connected to each other by the operation of the third clutch C3, the input is performed through the first rotational shaft TM1, and the second and fourth rotational shafts TM2 and TM4 are operated as the fixing element by the operation of the first and second brakes B1 and B2, such that a shift of advance 9-speed is implemented and is outputted through the seventh rotational shaft TM7.

In an advance 10-speed shift stage (10TH), the first and third clutches C1 and C3 and the first brake B1 are simultaneously operated. Thus, in a state in which the fourth rotational shaft TM4 and the seventh rotational shaft TM7 are connected to each other by the operation of the first clutch C1, and the first rotational shaft TM1 and the sixth rotational shaft TM6 are connected to each other by the operation of the third clutch C3, the input is performed through the first rotational shaft TM1, and the second rotational shaft TM2 is operated as the fixing element by the operation of the first brake B1, such that a shift of advance 10-speed is implemented and is outputted through the seventh rotational shaft TM7.

In a reverse 1-speed shift stage (REV1), the first, second, and third brakes B1, B2, and B3 are simultaneously operated. Thus, in a state in which the input is performed through the first rotational shaft TM1, the second, fourth, and eighth rotational shafts TM2, TM4, and TM8 are operated as the fixing element by the operation of the first, second, and third brakes B1, B2, and B3, such that a shift of reverse 1-speed is implemented and is outputted through the seventh rotational shaft TM7.

In a reverse 2-speed shift stage (REV2), the first clutch C1 and the first and third brakes B1 and B3 are simultaneously operated. Thus, in a state in which the fourth rotational shaft TM4 and the seventh rotational shaft TM7 are connected to each other by the operation of the first clutch C1, the input is performed through the first rotational shaft TM1, and the second and eighth rotational shafts TM2 and TM8 are operated as the fixing element by the operation of the first and third brakes B1 and B3, such that a shift of reverse 2-speed is implemented and is outputted through the seventh rotational shaft TM7.

As described above, the planetary gear train according to various embodiments of the present invention may implement a shift stage of advance 10-speed and reverse 2-speed with the fourth planetary gear sets PG1, PG2, PG3, and PG4 by the operation control of the fourth clutches C1, C2, C3, and C4, and the three brakes B1, B2, and B3.

In addition, inter-stage ratios of all shift stages except for advance 6 and 7 shift stages are 1.2 or more and the linearity thereof is secured, thereby making it possible to improve drivability such as acceleration before and after the shift, an engine speed rhythmic sense, and the like.

In addition, since the span of the shift ratio of 9.0 or more is secured, engine running efficiency may be maximized.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicles, the planetary gear train comprising:
an input shaft receiving power of an engine;
an output shaft outputting shifted power of the engine;
a first planetary gear set including first, second, and third rotational elements;
a second planetary gear set including fourth, fifth, and sixth rotational elements;
a third planetary gear set including seventh, eighth, and ninth rotational elements;
a fourth planetary gear set including tenth, eleventh, and twelfth rotational elements; and
seven control elements disposed between the rotational elements and at positions at which the rotational elements and a transmission housing are selectively connected,
wherein the input shaft is continuously connected to the first rotational element,
the output shaft is continuously connected to the eleventh rotational element,
the third rotational element is continuously connected to the fifth rotational element,
the sixth rotational element is continuously connected to the seventh rotational element,
the eighth rotational element is continuously connected to the twelfth rotational element,
the ninth rotational element is continuously connected to the eleventh rotational element,
the second rotational element is selectively connected to the input shaft through a portion of the control elements, and
three control elements of the seven control elements are operated, such that ten advance speeds and at least one reverse speed are implemented.

2. The planetary gear train of the automatic transmission for vehicles of claim 1, wherein:
the second rotational element is selectively connected to the transmission housing,
the fourth rotational element is selectively connected to the transmission housing,
the tenth rotational element is selectively connected to the transmission housing,
the output shaft is selectively connected to the fourth rotational element,
the input shaft is selectively connected to the eighth rotational element, and
the sixth rotational element is selectively connected to the second rotational element.

3. The planetary gear train of the automatic transmission for vehicles of claim 1, wherein:
the first, second, and third rotational elements of the first planetary gear set are a sun gear, a planetary carrier, and a ring gear, respectively,
the fourth, fifth, and sixth rotational elements of the second planetary gear set are a sun gear, a planetary carrier, and a ring gear, respectively,
the seventh, eighth, and ninth rotational elements of the third planetary gear set are a sun gear, a planetary carrier, and a ring gear, respectively, and
the tenth, eleventh, and twelfth rotational elements of the fourth planetary gear set are a sun gear, a planetary carrier, and a ring gear, respectively.

4. A planetary gear train of an automatic transmission for vehicles, the planetary gear train comprising:
an input shaft receiving power of an engine;
an output shaft outputting shifted power;
a first planetary gear set including first, second, and third rotational elements;
a second planetary gear set including fourth, fifth, and sixth rotational elements;
a third planetary gear set including seventh, eighth, and ninth rotational elements;
a fourth planetary gear set including tenth, eleventh, and twelfth rotational elements; and
seven control elements disposed between the rotational elements and at positions where the rotational elements and a transmission housing are selectively connected;
a first rotational shaft including the first rotational element and directly connected to the input shaft;
a second rotational shaft including the second rotational element and selectively connected to the first rotational shaft and selectively connected to the transmission housing simultaneously;
a third rotational shaft including the third rotational element and the fifth rotational element;
a fourth rotational shaft including the fourth rotational element and selectively connected to the transmission housing;
a fifth rotational shaft including the sixth rotational element and the seventh rotational element and selectively connected to the second rotational element;
a sixth rotational shaft including the eighth rotational element and the twelfth rotational element and selectively connected to the first rotational element;
a seventh rotational shaft including the ninth rotational element and the eleventh rotational element and selectively connected to the fourth rotational shaft and directly connected to the output shaft simultaneously; and
an eighth rotational shaft including the tenth rotational element and selectively connected to the transmission housing.

5. The planetary gear train of the automatic transmission for vehicles of claim 4, wherein:
the first planetary gear set is a single pinion planetary gear set, the first rotational element is a first sun gear, the second rotational element is a first planetary carrier, and the third rotational element is a first ring gear,
the second planetary gear set is a single pinion planetary gear set, the fourth rotational element is a second sun gear, the fifth rotational element is a second planetary carrier, and the sixth rotational element is a second ring gear,
the third planetary gear set is a single pinion planetary gear set, the seventh rotational element is a third sun gear, the eighth rotational element is a third planetary carrier, and the ninth rotational element is a third ring gear, and
the fourth planetary gear set is a single pinion planetary gear set, the tenth rotational element is a fourth sun gear, the eleventh rotational element is a fourth planetary carrier, and the twelfth rotational element is a fourth ring gear.

6. The planetary gear train of the automatic transmission for vehicles of claim 4, wherein the seven control elements include:

a first clutch selectively connecting the fourth rotational shaft and the seventh rotational shaft to each other;
a second clutch selectively connecting the first rotational shaft and the second rotational shaft to each other;
a third clutch selectively connecting the first rotational shaft and the sixth rotational shaft to each other;
a fourth clutch selectively connecting the second rotational shaft and the fifth rotational shaft to each other;
a first brake selectively connecting the second rotational shaft and the transmission housing to each other;
a second brake selectively connecting the fourth rotational shaft and the transmission housing to each other; and
a third brake selectively connecting the eighth rotational shaft and the transmission housing to each other.

7. The planetary gear train of the automatic transmission for vehicles of claim 6, wherein shift stages implemented by a selective operation of the seven control elements include:
a first advance shift stage implemented by a simultaneous operation of the fourth clutch and the second and third brakes;
a second advance shift stage implemented by a simultaneous operation of the second and fourth clutches and the third brake;
a third advance shift stage implemented by a simultaneous operation of the second clutch and the second and third brakes;
a fourth advance shift stage implemented by a simultaneous operation of the third clutch and the second and third brakes;
a fifth advance shift stage implemented by a simultaneous operation of the second and third clutches and the second brake;
a sixth advance shift stage implemented by a simultaneous operation of the second, third, and fourth clutches;
a seventh advance shift stage implemented by a simultaneous operation of the third and fourth clutches and the second brake;
an eighth advance shift stage implemented by a simultaneous operation of the third and fourth clutches and the first brake;
a ninth advance shift stage implemented by a simultaneous operation of the third clutch and the first and second brakes;
a tenth advance shift stage implemented by a simultaneous operation of the first and third clutches and the first brake;
a first reverse shift stage implemented by a simultaneous operation of the first, second, and third brakes; and
a second reverse shift stage implemented by a simultaneous operation of the first clutch and the first and third brakes.

8. A planetary gear train of the automatic transmission for vehicles, the planetary gear train comprising:
an input shaft receiving power of an engine;
an output shaft outputting shifted power of the engine;
a first planetary gear set including first, second, and third rotational elements;
a second planetary gear set including fourth, fifth, and sixth rotational elements;
a third planetary gear set including seventh, eighth, and ninth rotational elements;
a fourth planetary gear set including tenth, eleventh, and twelfth rotational elements;
a first rotational shaft including the first rotational element and directly connected to the input shaft;
a second rotational shaft including the second rotational element and selectively connected to the first rotational shaft and selectively connected to a transmission housing simultaneously;
a third rotational shaft including the third rotational element and the fifth rotational element;
a fourth rotational shaft including the fourth rotational element and selectively connected to the transmission housing;
a fifth rotational shaft including the sixth rotational element and the seventh rotational element and selectively connected to the second rotational element;
a sixth rotational shaft including the eighth rotational element and the twelfth rotational element and selectively connected to the first rotational element;
a seventh rotational shaft including the ninth rotational element and the eleventh rotational element and selectively connected to the fourth rotational shaft and directly connected to the output shaft simultaneously;
an eighth rotational shaft including the tenth rotational element and selectively connected to the transmission housing;
a first clutch selectively connecting the fourth rotational shaft and the seventh rotational shaft to each other;
a second clutch selectively connecting the first rotational shaft and the second rotational shaft to each other;
a third clutch selectively connecting the first rotational shaft and the sixth rotational shaft to each other;
a fourth clutch selectively connecting the second rotational shaft and the fifth rotational shaft to each other;
a first brake selectively connecting the second rotational shaft and the transmission housing to each other;
a second brake selectively connecting the fourth rotational shaft and the transmission housing to each other; and
a third brake selectively connecting the eighth rotational shaft and the transmission housing to each other.

9. The planetary gear train of an automatic transmission for vehicles of claim 8, wherein:
the first planetary gear set is a single pinion planetary gear set, the first rotational element thereof is a first sun gear, the second rotational element thereof is a first planetary carrier, and the third rotational element thereof is a first ring gear,
the second planetary gear set is a single pinion planetary gear set, the fourth rotational element is a second sun gear, the fifth rotational element is a second planetary carrier, and the sixth rotational element is a second ring gear,
the third planetary gear set is a single pinion planetary gear set, the seventh rotational element is a third sun gear, the eighth rotational element is a third planetary carrier, and the ninth rotational element is a third ring gear, and
the fourth planetary gear set is a single pinion planetary gear set, the tenth rotational element is a fourth sun gear, the eleventh rotational element is a fourth planetary carrier, and the twelfth rotational element is a fourth ring gear.

10. The planetary gear train of the automatic transmission for vehicles of claim 8, wherein shift stages implemented by a selective operation of the first, second, third, and fourth clutches and the first, second, and third brakes include:
a first advance shift stage implemented by a simultaneous operation of the fourth clutch and the second and third brakes;

a second advance shift stage implemented by a simultaneous operation of the second and fourth clutches and the third brake;
a third advance shift stage implemented by a simultaneous operation of the second clutch and the second and third brakes;
a fourth advance shift stage implemented by a simultaneous operation of the third clutch and the second and third brakes;
a fifth advance shift stage implemented by a simultaneous operation of the second and third clutches and the second brake;
a sixth advance shift stage implemented by a simultaneous operation of the second, third, and fourth clutches;
a seventh advance shift stage implemented by a simultaneous operation of the third and fourth clutches and the second brake;
an eighth advance shift stage implemented by a simultaneous operation of the third and fourth clutches and the first brake;
a ninth advance shift stage implemented by a simultaneous operation of the third clutch and the first and second brakes;
a tenth advance shift stage implemented by a simultaneous operation of the first and third clutches and the first brake;
a first reverse shift stage implemented by a simultaneous operation of the first, second, and third brakes; and
a second reverse shift stage implemented by a simultaneous operation of the first clutch and the first and third brakes.

11. A planetary gear train of an automatic transmission for vehicles, the planetary gear train comprising:
an input shaft receiving power of an engine;
an output shaft outputting shifted power of the engine;
a first planetary gear set, which is a single pinion planetary gear set, including a first sun gear, a first planetary carrier, and a first ring gear;
a second planetary gear set, which is a single pinion planetary gear set, including a second sun gear, a second planetary carrier, and a second ring gear;
a third planetary gear set, which is a single pinion planetary gear set, including a third sun gear, a third planetary carrier, and a third ring gear;
a fourth planetary gear set, which is a single pinion planetary gear set, including a fourth sun gear, a fourth planetary carrier, and a fourth ring gear;
a first rotational shaft including the first sun gear and directly connected to the input shaft;
a second rotational shaft including the first planetary carrier and selectively connected to the first rotational shaft and selectively connected to a transmission housing simultaneously;
a third rotational shaft including the first ring gear and the second planetary carrier;
a fourth rotational shaft including the second sun gear and selectively connected to the transmission housing;
a fifth rotational shaft including the second ring gear and the third sun gear and selectively connected to the second rotational shaft;
a sixth rotational shaft including the third planetary carrier and the fourth ring gear and selectively connected to the first rotational shaft;
a seventh rotational shaft including the third ring gear and the fourth planetary carrier and selectively connected to the fourth rotational shaft and directly connected to the output shaft simultaneously;
an eighth rotational shaft including the fourth sun gear and selectively connected to the transmission housing; and
seven control elements disposed between the rotational shafts and at selective connection positions between the rotational shafts and the transmission housing.

12. The planetary gear train of the automatic transmission for vehicles of claim 11, wherein the seven control elements include:
a first clutch selectively connecting the fourth rotational shaft and the seventh rotational shaft to each other;
a second clutch selectively connecting the first rotational shaft and the second rotational shaft to each other;
a third clutch selectively connecting the first rotational shaft and the sixth rotational shaft to each other;
a fourth clutch selectively connecting the second rotational shaft and the fifth rotational shaft to each other;
a first brake selectively connecting the second rotational shaft and the transmission housing to each other;
a second brake selectively connecting the fourth rotational shaft and the transmission housing to each other; and
a third brake selectively connecting the eighth rotational shaft and the transmission housing to each other.

13. The planetary gear train of the automatic transmission for vehicles of claim 12, wherein shift stages implemented by a selective operation of the seven control elements include:
a first advance shift stage implemented by a simultaneous operation of the fourth clutch and the second and third brakes;
a second advance shift stage implemented by a simultaneous operation of the second and fourth clutches and the third brake;
a third advance shift stage implemented by a simultaneous operation of the second clutch and the second and third brakes;
a fourth advance shift stage implemented by a simultaneous operation of the third clutch and the second and third brakes;
a fifth advance shift stage implemented by a simultaneous operation of the second and third clutches and the second brake;
a sixth advance shift stage implemented by a simultaneous operation of the second, third, and fourth clutches;
a seventh advance shift stage implemented by a simultaneous operation of the third and fourth clutches and the second brake;
an eighth advance shift stage implemented by a simultaneous operation of the third and fourth clutches and the first brake;
a ninth advance shift stage implemented by a simultaneous operation of the third clutch and the first and second brakes;
a tenth advance shift stage implemented by a simultaneous operation of the first and third clutches and the first brake;
a first reverse shift stage implemented by a simultaneous operation of the first, second, and third brakes; and
a second reverse shift stage implemented by a simultaneous operation of the first clutch and the first and third brakes.

* * * * *